P. E. HILTON.
TRACTION WHEEL.
APPLICATION FILED AUG. 7, 1917.

1,259,098.

Patented Mar. 12, 1918.
2 SHEETS—SHEET 2.

Witnesses

Inventor
P. E. Hilton

By
Attorneys

UNITED STATES PATENT OFFICE.

PRINCE EDGAR HILTON, OF SAN FRANCISCO, CALIFORNIA.

TRACTION-WHEEL.

1,259,098.

Specification of Letters Patent.

Patented Mar. 12, 1918.

Application filed August 7, 1917. Serial No. 184,901.

*To all whom it may concern:*

Be it known that I, PRINCE EDGAR HILTON, a citizen of the United States, residing at San Francisco, in the county of San Francisco and State of California, have invented a new and useful Traction-Wheel; and I do hereby declare the following to be a full, clear, and exact description of the invention, such as will enable others skilled in the art to which it appertains to make and use the same.

This invention relates to an improved traction wheel for various motor driven farming machines, traction engines and the like.

One of the objects of the invention is the provision of a device of this kind having a broad elongated tread service, thereby insuring the best possible efficiency in the traction of the wheel.

A further object of the invention is to provide an improved traction wheel of substantially elliptical shape having an endless chain of gear segment plates provided with roller bearings which operate in elliptical shaped raceways in opposite sides of hub plates of the wheel, in combination with means for driving said endless chain of segment plates.

In practical fields, the details of construction may necessitate alterations falling within the scope of what is claimed.

The invention comprises further features and combination of parts, as hereinafter set forth, shown in the drawings, and claimed.

In the drawings:—

Fig. 5 is a longitudinal sectional view on line 5—5 of Fig. 2.

Figure 1:
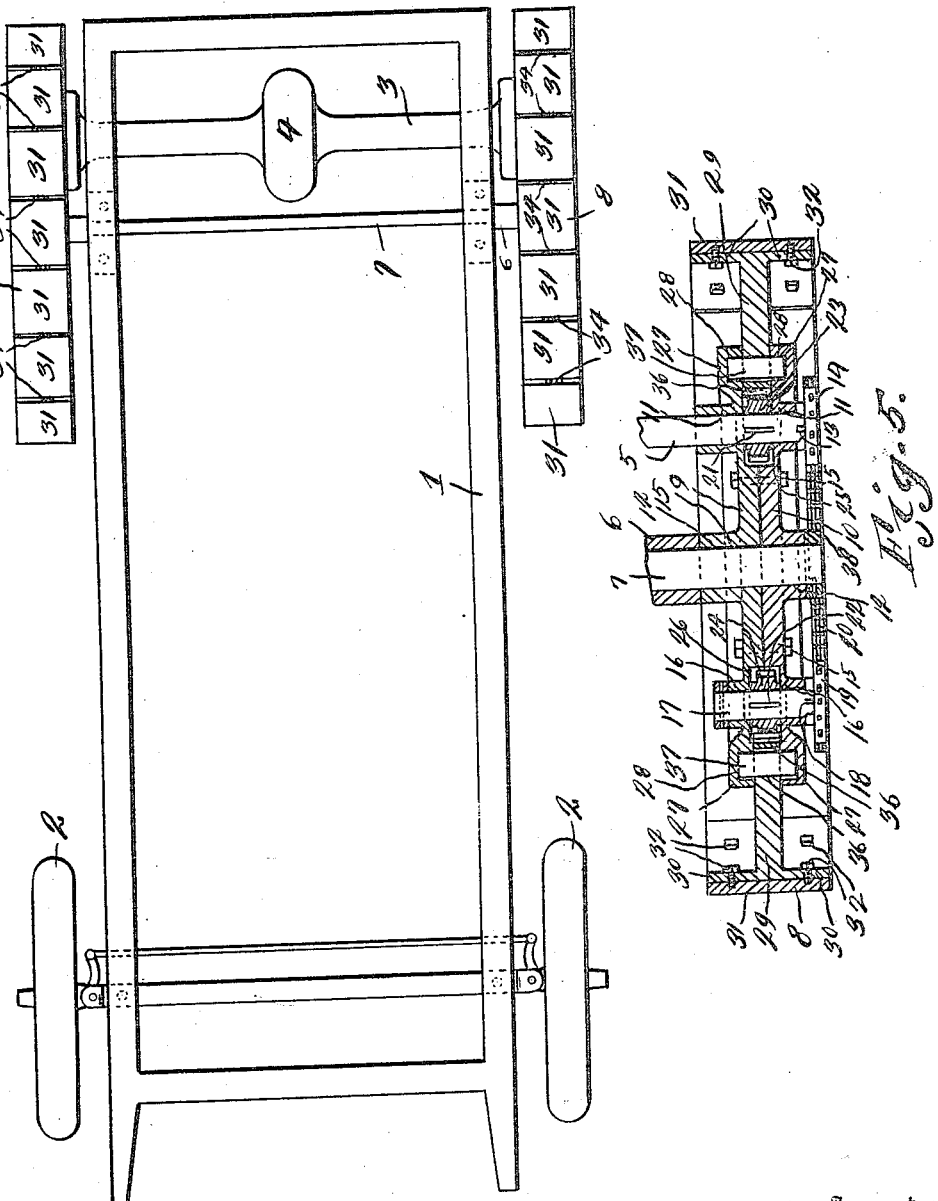
Figure 1 is a plan view of a frame of a motor driven farming machine or the like, showing a pair of the improved traction wheels applied thereto.
Figures 2, 3, 4:
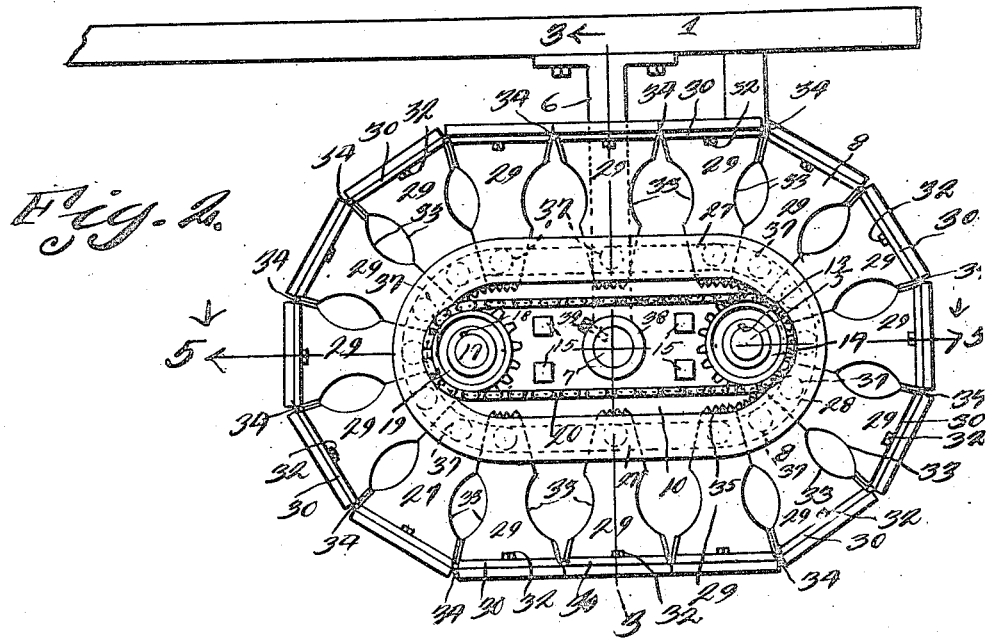
Fig. 2 is a view in side elevation of one of the traction wheels.
Fig. 3 is a sectional view on line 3—3 of Fig. 2.
Fig. 4 is a side view of the traction wheel, showing the outer plate of the hub removed, and parts illustrated in section, on line 4—4 of Fig. 3.

Referring more especially to the drawings, 1 designates the frame of any suitable motor driven farming machine, such as a traction engine or the like and provided with the front steering wheels 2, and journaled in bearings at the rear of the frame is the usual axle casing 3 provided with the differential gear casing 4 and operative in the axle casing is the usual drive axle or shaft 5, the differential gear mechanism (not shown) of which may be of any conventional construction. Mounted in suitable bearings of depending supports 6 of the frame 1 is a supporting axle or shaft 7. Journaled upon the opposite ends of the shafts or axles 5 and 7 are the improved traction wheels 8. The hub of each traction wheel consists of the opposing inner and outer hub plates 9 and 10, in bearings 11 and 12 of which the drive and supporting axles 5 and 7 are arranged, there being a key 13 in the axle 5 for keying the sprocket wheel 14 thereto. The hub plates 9 and 10 are secured together by the bolts 15. The forward end portions of the hub plates have additional bearings 16 for the reception of the stub axle 17, and keyed by means of a feather 18 to the outer end of said stub axle 17 is a sprocket 19, about which a sprocket chain 20 (which also travels about the sprocket wheel 14) passes, whereby, as motion is imparted to the drive axle 5, it is transmitted to the stub shaft. Keyed by means of the feathers 21 and 22 to the drive axle 5 and the stub shaft 17 respectively, are gears 23 and 24. The adjacent faces of the hub plates, where the gears 23 and 24 are located, are chambered out, as shown at 25 and 26, for the reception of said gears 23 and 24. It is to be noted that the hub plates are substantially elliptical in contour, and the marginal portions of said hub plates are provided with extension flanges 27, which are rectangular in cross section so as to form raceways 28. Adjacent where the gears 23 and 24 are located, said raceways are in communication with the chambers 25 and 26, the purpose of which will presently appear. The shape or contour of the traction wheel in side elevation is substantially elliptical, thereby conforming to the correspondingly shaped hub plates 9 and 10, and the main unit of the traction wheel consists of an endless chain of segment gear plates 29, which are preferably of the shape shown. The outer portions of said segment gear plates are provided with broad, flat flanges 30, to which any suitable tread plates 31, preferably of rubber or other suitable composition, are secured by means of the bolts 32. When said segment gear plates are moving about in a concentric plane with the end portions of the raceways, they are positioned radially from the centers of said curved end portions of said raceways, and their adjacent edges substantially meet or contact, except where the edges are cut away, as shown at 33 to lighten the segment gear plates. By means of suitable hinges 34 the flanged portions of the segment gear plates are hingedly united endlessly and sequentially. The inner ends of the segment plates are provided with suitable teeth 35, to mesh with the teeth of said gears 23 and 24. whereby, when power is imparted to the axle or drive shaft 5, motion will be transmitted to the segment gear plates, and push or operate them in a plane corresponding to the substantially elliptical shape of the hub plates, and owing to the stub shaft being geared by the sprocket chain to the drive axle or shaft 5, said stub shaft will be positive in imparting additional power to the segment gear plates. The segment plates are provided with circular openings 36 in which rollers 37 are journaled. These rollers are of less diameters than the openings 36, so that said rollers may be disposed eccentrically with relation to the openings, whereby only one side of each opening may contact with one side of each roller, particularly where the upward pressure of the gear plate acts upon the roller. The raceways 28 in cross section are wider than the diameters of the rollers, whereby the rollers may contact with the innermost walls of the raceways, at points diametrically opposite where the rollers contact with the openings 36. Hence, by this construction and arrangement of the parts, the rollers will freely rotate with the least possible friction, thereby allowing the tread plates 31 to more efficiently pull on the surface of the roadbed. A suitable collar 38 is secured by a set bolt 39 on each end of the supporting axle or shaft 7, thereby holding the hub plates in place, and by means of the set bolts 40 passing through the bearing of the depending support 6 and engaging the axle or shaft 7, prevents axial movement of said shaft. By means of the shaft 7 and its arrangement and connections, the traction wheel is held in position, and both wheels uniformly with relation to each other.

The invention having been set forth, what is claimed as new and useful is:—

1. In a traction wheel, a pair of elongated hub plates having a stub axle journaled in bearings thereof at one end of the hub, and a drive axle or shaft in bearings of said plates at the other end of the hub, gear connections between said drive and driven shafts, said driving and driven shafts having gears, segment gear plates hingedly united in sequence and operating between the adjacent faces of the hub plate, and having their inner ends provided with gear teeth meshing with said gear, and tread means carried by said segment gear plates.

2. In a traction wheel, a hub comprising adjacent elongated hub plates provided with raceways in their marginal portions and conforming to their elongated contour, a driven axle having a gear imposed between said plates and mounted in bearings at one end of the hub, a driving axle mounted in a bearing at the other end of the hub and having a gear arranged between said hub plate, connections between the driving and driven axles, an endless chain of tread members provided with radial segment plates extending toward the raceways and provided with roller bearings engaging said raceways, the inner ends of said segment plates having teeth meshing with the teeth of the gears of the driving and driven axles.

3. In a traction wheel, an endless chain of tread members having segment gear plates, an elongated hub comprising adjacent hub plates having their marginal portions provided with raceways, and between which marginal portions the segment gear plates travel, roller bearings carried by the segment gear plates and engaging said raceways, and driving and driven elements having gear connections and provided with gear connections with said segment gear plates, whereby motion may be imparted to the segment gear plates and their tread members.

In testimony whereof I have signed my name to this specification in the presence of two subscribing witnesses.

PRINCE EDGAR HILTON.

Witnesses:
P. P. BREFEELE,
MELKIN FRIEDLANDER.